(12) United States Patent
Frost et al.

(10) Patent No.: US 8,930,622 B2
(45) Date of Patent: Jan. 6, 2015

(54) MULTI-LEVEL DATA PROTECTION FOR FLASH MEMORY SYSTEM

(71) Applicant: International Business Machines Corporation, Armonk, NY (US)

(72) Inventors: Holloway H. Frost, Houston, TX (US); Charles J. Camp, Sugar Land, TX (US); Ken Scianna, Houston, TX (US); Lance W. Shelton, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 13/707,387

(22) Filed: Dec. 6, 2012

(65) Prior Publication Data

US 2013/0124788 A1   May 16, 2013

Related U.S. Application Data

(60) Continuation-in-part of application No. 12/971,286, filed on Dec. 17, 2010, now Pat. No. 8,443,136, which is a division of application No. 12/554,891, filed on Sep. 5, 2009, now Pat. No. 7,856,528.

(60) Provisional application No. 61/567,574, filed on Dec. 6, 2011, provisional application No. 61/232,913, filed on Aug. 11, 2009.

(51) Int. Cl.
*G06F 12/00* (2006.01)
*G06F 12/02* (2006.01)
*G06F 11/10* (2006.01)

(52) U.S. Cl.
CPC .......... *G06F 12/0246* (2013.01); *G06F 11/108* (2013.01)

USPC ........................... 711/114; 711/115; 711/202

(58) Field of Classification Search
USPC .......................... 711/114, 115, 202
See application file for complete search history.

(56) References Cited

U.S. PATENT DOCUMENTS

| | | |
|---|---|---|
| 5,170,400 A | 12/1992 | Dotson |
| 5,875,456 A | 2/1999 | Stallmo et al. |
| 6,041,423 A | 3/2000 | Tsukerman |
| 6,052,759 A | 4/2000 | Stallmo et al. |
| 6,098,119 A | 8/2000 | Surugucchi et al. |
| 6,115,837 A | 9/2000 | Nguyen et al. |
| 6,158,017 A | 12/2000 | Han et al. |
| 6,282,039 B1 | 8/2001 | Bartlett |
| 6,282,670 B1 | 8/2001 | Rezaul Islam et al. |
| 6,311,251 B1 | 10/2001 | Merritt et al. |
| 6,347,359 B1 | 2/2002 | Smith et al. |
| 6,516,425 B1 | 2/2003 | Belhadj et al. |

(Continued)

OTHER PUBLICATIONS

Fusion-io. "Taming the Power Hungry Data Center." Fusion-io White Paper, 2007, [retrieved from the Internet on Aug. 28, 2009 using <URL: http://www.fusionio.com/PDFs/Whitepaper_Green.pdf>].

(Continued)

*Primary Examiner* — Gurtej Bansal
(74) *Attorney, Agent, or Firm* — Locke Lord LLP

(57) ABSTRACT

The disclosed embodiments are directed to methods and apparatuses for providing efficient and enhanced protection of data stored in a FLASH memory system. The methods and apparatuses involve a system controller for a plurality of FLASH memory devices in the FLASH memory system that is capable of protecting data using two layers of data protection, including inter-card card stripes and intra-card page stripes.

10 Claims, 2 Drawing Sheets

(56) References Cited

U.S. PATENT DOCUMENTS

| | | | |
|---|---|---|---|
| 6,718,434 | B2 | 4/2004 | Veitch et al. |
| 6,718,437 | B2 | 4/2004 | Don et al. |
| 6,795,895 | B2 | 9/2004 | Merkey et al. |
| 6,867,999 | B2 | 3/2005 | Yoo et al. |
| 6,938,123 | B2 | 8/2005 | Willis |
| 7,024,586 | B2 | 4/2006 | Kleiman et al. |
| 7,076,606 | B2 | 7/2006 | Orsley |
| 7,120,826 | B2 | 10/2006 | Fore et al. |
| 7,134,066 | B2 | 11/2006 | Hassner et al. |
| 7,162,678 | B2 | 1/2007 | Saliba |
| 7,173,852 | B2 | 2/2007 | Gorobets et al. |
| 7,257,674 | B2 | 8/2007 | Kobayashi et al. |
| 7,299,401 | B2 | 11/2007 | Fukuda |
| 7,328,307 | B2 | 2/2008 | Hoogterp |
| 7,409,492 | B2 | 8/2008 | Tanaka et al. |
| 7,433,998 | B2 | 10/2008 | Dawkins |
| 7,437,600 | B2 | 10/2008 | Tachikawa |
| 7,454,639 | B2 | 11/2008 | Jain et al. |
| 7,502,886 | B1 | 3/2009 | Kowalchik et al. |
| 7,519,624 | B2 | 4/2009 | Korupolu et al. |
| 7,577,866 | B1 | 8/2009 | Fan et al. |
| 7,710,777 | B1 | 5/2010 | Montierth et al. |
| 7,721,146 | B2 | 5/2010 | Polisetti et al. |
| 7,734,865 | B2 | 6/2010 | Tanaka |
| 7,818,525 | B1 | 10/2010 | Frost et al. |
| 7,856,528 | B1 | 12/2010 | Frost et al. |
| 7,890,795 | B1 | 2/2011 | Madnani et al. |
| 7,941,696 | B2 | 5/2011 | Frost et al. |
| 8,176,284 | B2 | 5/2012 | Frost et al. |
| 8,176,360 | B2 | 5/2012 | Frost et al. |
| 8,190,842 | B2 | 5/2012 | Frost et al. |
| 8,443,136 | B2 | 5/2013 | Frost et al. |
| 8,560,881 | B2 | 10/2013 | Frost et al. |
| 8,775,772 | B2 | 7/2014 | Frost et al. |
| 2003/0120864 | A1 | 6/2003 | Lee et al. |
| 2005/0086575 | A1 | 4/2005 | Hassner et al. |
| 2005/0144363 | A1 | 6/2005 | Sinclair |
| 2006/0184723 | A1 | 8/2006 | Sinclair et al. |
| 2006/0200481 | A1 | 9/2006 | Goyan |
| 2007/0232906 | A1 | 10/2007 | Alexandru |
| 2007/0294570 | A1 | 12/2007 | Polisetti et al. |
| 2008/0016435 | A1 | 1/2008 | Goel |
| 2008/0052451 | A1 | 2/2008 | Pua |
| 2008/0059707 | A1 | 3/2008 | Makineni et al. |
| 2008/0098158 | A1 | 4/2008 | Kitahara |
| 2008/0282024 | A1 | 11/2008 | Biswas |
| 2008/0288436 | A1 | 11/2008 | Priya N V |
| 2009/0172335 | A1 | 7/2009 | Kulkarni et al. |
| 2009/0193174 | A1 | 7/2009 | Reid |
| 2009/0193314 | A1 | 7/2009 | Melliar-Smith et al. |
| 2009/0240873 | A1 | 9/2009 | Yu et al. |
| 2009/0327840 | A1 | 12/2009 | Moshayedi |
| 2010/0005228 | A1 | 1/2010 | Fukutomi et al. |
| 2010/0017650 | A1 | 1/2010 | Chin et al. |
| 2010/0023675 | A1 | 1/2010 | Chen et al. |
| 2010/0083040 | A1 | 4/2010 | Voigt et al. |
| 2010/0107021 | A1 | 4/2010 | Nagadomi et al. |

OTHER PUBLICATIONS

Center for Advanced Defense Studies. "Technical Overview: Fusion-io." Center for Advanced Defense Studies, [retrieved from the Internet on Aug. 28, 2009 using <URL: http://eti.c4ads.org/sites/default/files/PCO29_FusionIO.pdf>].

Fusion-io. "Fusion-io's Solid State Storage—A New Standard for Class Reliability." Fusion-io White Paper, 2007, [retrieved from the Internet on Aug. 28, 2009 using <URL: http://www.fusionio.com/PDFs/Whitepaper_Solidstatestorage2.pdf>].

Simitci, H. and Reed, D., University of Illinois Department of Computer Science. "Adaptive Disk Striping for Parallel Input/Output." Proceedings of the Seventh Goddard Conference on Mass Storage Systems and Technologies, Mar. 1999, pp. 88-102, IEEE Computer Society.

Chang, L. and Kuo, T., National Taiwan University. "An Adaptive Striping Architecture for Flash Memory Storage Systems of Embedded Systems." Proceedings of the 8th IEEE Real-Time and Embedded Technology and Applications Symposium, Sep. 25-27, 2002, IEEE Computer Society.

Agrawal, N., Prabhakaran, V., Wobber, T., Davis, J., Manasse, M. and Panigrahy, R., University of Wisconsin-Madison "Design Tradeoffs for SSD Performance." Proceedings of the USENIX Technical Conference, Jun. 2008, [retrieved from the Internet on Aug. 28, 2009 using <URL: http://research.microsoft.com/pubs/63596/USENIX-08-SSD.pdf>].

Zertal, S., University of Versailles. "A Reliability Enhancing Mechanism for a Large Flash Embedded Satellite Storage System." Proceedings of the Third International Conference on Systems, 2008, pp. 345-350, IEEE Computer Society.

Shin, J., Xia, Z., Xu, N., Gao, R., Cai, X., Maeng, S. and Hsu, F. "FTL Design Exploration in Reconfigurable High-Performance SSD for Server Applications." Proceedings of the 23rd International Conference on Supercomputing, Jun. 8-12, 2009, New York.

Wu, C., National Taiwan University. "A Time-Predictable System Initialization Design for Huge-Capacity Flash-Memory Storage Systems." Proceedings of the 6th IEEE/ACM/IFIP International Conference on Hardware/Software Codesign, Sep. 19-24, 2008, pp. 13-18, ACM, Atlanta.

Pariseau, B. "A Technology Deep-Dive with Fusion-io." IT Knowledge Exchange, Mar. 3, 2009, [retrieved from the Internet on Sep. 10, 2009 using <URL: http://itknowledgeexchange.techtarget.com/storage-soup/a-technology-deep-dive-with-fusion-io/>].

"Understanding RAID level-5EE." IBM Systems Software Information Center, [retrieved from the Internet on Sep. 10, 2009 using <URL: http://publib.boulder.ibm.com/infocenter/eserver/v1r2/index.jsp?topic=/diricinfo/fqy0_craid5ee.html/>].

"Non-standard RAID levels." Wikipedia, [retrieved from the Internet on Sep. 10, 2009 using <URL: http://en.wikipedia.org/wiki/Non-standard_RAID_levels/>].

"RAID." Wikipedia, [retrieved from the Internet on Sep. 10, 2009 using <URL: http://en.wikipedia.org/wiki/RAID>].

Hutsell, W., Bowen, J. and Ekker, N. "Flash Solid-State Disk Reliability." Texas Memory Systems White Paper, Nov. 2008.

Chang, Yu-Bin and Chang, Li-Pin, National Chiao-Tung University. "A Self-Balancing Striping Scheme for NAND-Flash Storage Systems." 23rd ACM Symposium on Applied Computing '08. Mar. 16-20, 2008, pp. 1715-1719, Brazil.

Chen, F., Koufaty, D. and Zhang, X. "Understanding Intrinsic Characteristics and System Implications of Flash Memory based Solid State Drives." SIGMetrics/Performance '09, Jun. 15-19, 2009, pp. 181-192, Seattle, Washington.

Lee, Sang-Won., Moon, B. and Park, C. "Advances in Flash Memory SSD Technology for Enterprise Database Applications." SIGMOD '09, Jun. 29-Jul. 2, 2009, pp. 863-870, Providence, Rhode Island.

Dholakia, A., Eleftheriou, E., Hu, Xiao-Yu, Iliadis, I., Menon, J., and Rao, KK. "Analysis of a New Intra-Disk Redundancy Scheme for High-Reliability RAID Storage Systems in the Presence of Unrecoverable Errors." SIGMetrics/Performance '06, Jun. 26-30, 2006, pp. 373-373, France.

Wu, Chin-Hsien, Kuo Tei-Wei, and Chang, Li-Pin. "The Design of Efficient Initialization and Crash Recovery for Log-based File Systems Over Flash Memory." ACM Transactions on Storage, vol. 2, No. 4, Nov. 2006, pp. 449-467, New York, New York.

"Electric double-layer capacitor," Wikipedia, [retrieved from the Internet on Aug. 5, 2009 using <URL: http://en.wikipedia.org/wiki/Ultracapacitors>].

Norman, L., "RamSan-20 PCIe Flash SSD: Expanding the role of Flash in the enterprise," Texas Memory Systems White Paper, May 2009.

Hutsell, W., "An In-depth Look at the RamSan-620 Flash Solid State Disk," Texas Memory Systems White Paper, Jul. 2009.

Hutsell, W., "An In-depth Look at the RamSan-500 Cached Flash Solid State Disk," Texas Memory Systems White Paper, Mar. 2008.

Dholakia, A., Eleftheriou, E., Hu, X.Y., Iliadis, I., Menon, J., and Rao, K., "A New Intra-disk Redundancy Scheme for High-Reliability RAID Storage Systems in the Presence of Unrecoverable Errors," ACM Transactions on Storage, vol. 4, No. 1, Article 1, May 2008.

(56) References Cited

OTHER PUBLICATIONS

Son, Y.S., International Search Report for International Patent Application No. PCT/US2010/045129, Korean Intellectual Property Office, dated Mar. 4, 2011.

Son, Y.S., Written Opinion for International Patent Application No. PCT/US2010/045129, Korean Intellectual Property Office, dated Mar. 4, 2011.

Greenan, K. et al., "Building Flexible, Fault-Tolerant Flash-based Storage Systems", In: Proceedings of the 25th Workshop on Hot Topics in System Dependability, Jun. 2009.

MULTI-LEVEL DATA PROTECTION FOR FLASH MEMORY SYSTEM

CROSS REFERENCE TO RELATED APPLICATIONS

This application claims the benefit of priority to U.S. Provisional Application Ser. No. 61/567,574, entitled "Multi-level Data Protection for Flash Memory System," filed Dec. 6, 2011; and is a continuation-in-part of U.S. Non-Provisional application Ser. No. 12/971,286, entitled "Method and Apparatus for Protecting Data Using Variable Size Page Stripes in a Flash-Based Storage System," filed Dec. 17, 2010; which is a divisional of U.S. Non-Provisional application Ser. No. 12/554,891 (now U.S. Pat. No. 7,856,528), entitled "Method and Apparatus for Protecting Data Using Variable Size Page Stripes in a Flash-Based Storage System," filed Sep. 5, 2009, which claims priority to U.S. Provisional Application Ser. No. 61/232,913, entitled "Method and Apparatus for Efficient and Enhanced Protection, Storage and Retrieval of Data Stored in Multiple Flash Storage Locations," filed Aug. 11, 2009, the above applications being hereby incorporated herein by reference.

STATEMENT REGARDING FEDERALLY SPONSORED RESEARCH

Not applicable.

REFERENCE TO APPENDIX

Not applicable.

BACKGROUND OF THE INVENTION

1. Field of the Invention

This disclosure relates generally to methods and apparatus for improving the ability of a memory storage system to efficiently and effectively protect, store and retrieve data stored in multiple storage locations.

2. Description of the Related Art

In certain memory storage systems data is stored in multiple storage locations. For example, in some such systems, multiple individual hard disks or memory chips are used to store data and the data stored in one or more of the storage devices is associated with data stored in other storage devices in such a manner that data errors in one or more storage devices can be detected and possibly corrected. One such approach is to store a given quantity of data across multiple storage locations by dividing the data into data portions of equal length—the individual data portions sometimes being referred to as "data pages"—and then storing the data pages in multiple storage locations such that one data page is stored in each storage device. In connection with this approach, a further storage device may be used to store a page of data protection information, where a given page of data protection information is associated with a specific set of data pages stored in the multiple storage locations. In some instances, the set of data pages in the multiple locations that is used to store associated data is referred to as a "data stripe" or "page stripe."

In systems as described above, if there is a full or complete failure of the structure associated with a given memory location (e.g., the specific memory device associated with that location fails), the data protection information for a given data stripe can often be used to reconstruct the data in the data page that was stored in the failed memory location. Using the reconstructed data, the data for the entire data stripe may be reconstructed.

A novel system and method for using data stripes is disclosed in commonly-owned U.S. Pat. No. 7,856,528, "Method and Apparatus for Protecting Data Using Variable Size Page Stripes in a Flash-Based Storage System," issued on Dec. 21, 2010.

While the approach described above can beneficially detect and respond to the failure of a memory storage location within a memory storage system, additional protective measures can be beneficially provided.

SUMMARY OF THE INVENTION

The disclosed embodiments are directed to methods and apparatuses for providing efficient and enhanced protection of data stored in a FLASH memory system. The methods and apparatuses involve a system controller for a plurality of FLASH memory devices in the FLASH memory system that is capable of protecting data using two layers of data protection, including inter-card "card stripes" and intra-card "page stripes."

In general, in one aspect, the disclosed embodiments are directed to a Flash-based memory module. The Flash-based memory module comprises a plurality of input/output (I/O) modules, each I/O module configured to communicate with an external device over one or more external communication links, and a cross-bar switching element connected to and in communication with one or more of the I/O modules. The Flash-based memory module further comprises a plurality of Flash memory cards connected to and in communication with the crossbar switching element, each Flash memory card having a printed circuit board (PCB) and a plurality of Flash memory systems mounted on the PCB. The Flash memory system comprises: a) a plurality of Flash memory devices, each Flash memory device having a physical memory space that is divided into blocks, each block being further divided into pages, each page representing an individually addressable memory location on which memory operations are performed, multiple memory locations being erased at the same time in one-block groupings; and b) a Flash controller communicating independently with each Flash memory device to perform the memory operations, the Flash controller configured to store data in the Flash memory devices in the form of intra-card page stripes, each intra-card page stripe comprising a plurality of pages, including data pages and a data protection page, and each of the plurality of pages in the intra-card page stripe being stored in a Flash memory device that is different from the Flash memory devices in which the other pages in the intra-card page stripe are stored. The cross-bar switching element is configured to store data in the Flash memory cards in the form of inter-card card stripes, each inter-card card stripe comprising a plurality of pages, including data pages and a data protection page, and each of the plurality of pages in the inter-card card stripe being stored in a Flash memory card that is different from the Flash memory cards in which the other pages in the inter-card card stripe are stored.

In general, in another aspect, the disclosed embodiments are directed to a Flash-based memory module comprising a plurality of input/output (I/O) modules, each I/O module configured to communicate with an external device over one or more external communication links. The Flash-based memory module further comprises an intelligent cross-bar switching element connected to and in communication with one or more of the I/O modules, the intelligent cross-bar switching element configured to store data across multiple Flash memory cards in the form of inter-card card stripes, each inter-card card stripe comprising a plurality of pages, including data pages and a data protection page, and each of the plurality of pages in the inter-card card stripe being stored in a Flash memory card that is different from the Flash memory cards in which the other pages in the inter-card card stripe are stored. The intelligent cross-bar switching element is further configured to: (a) receive a READ or WRITE request from one of the I/O modules, the READ or WRITE request including a logical block address (LBA) reflecting a logical address to which data is to be written for a WRITE request or from which data is to be read for a READ request; (b) generate a second-level LBA (SLBA) upon receiving the READ or WRITE request; (c) for a WRITE request, generate inter-card data protection information (ICDPI) for an inter-card card stripe to be stored during a WRITE operation, the ICDPI allowing errors encountered during a READ operation of the inter-card card stripe to be corrected; (d) for a READ request, process ICDPI for an inter-card card stripe to correct errors encountered during a READ operation of the inter-card card stripe; and (e) provide the SLBA and the READ or WRITE request to one or more of the Flash memory cards for use as an intra-card LBA internally therein.

In general, in yet another aspect, the disclosed embodiments are directed to a method of protecting data in a Flash-based memory module. The method comprises storing data in the Flash-based memory module across multiple Flash memory cards in the form of inter-card card stripes, each inter-card card stripe comprising a plurality of pages, including data pages and a data protection page, and each of the plurality of pages in the inter-card card stripe being stored in a Flash memory card that is different from the Flash memory cards in which the other pages in the inter-card card stripe are stored. The method further comprises storing data in each Flash memory card in the form of intra-card page stripes, each intra-card page stripe comprising a plurality of pages, including data pages and a data protection page, and each of the plurality of pages in the intra-card page stripe being stored in a Flash memory device of the Flash memory card that is different from the Flash memory devices in which the other pages in the intra-card page stripe are stored. Storing data in the form of inter-card card stripes comprises (a) receiving a WRITE request including a logical block address (LBA) reflecting a logical address to which data is to be written; (b) generating a second-level LBA (SLBA) upon receiving the WRITE request; (c) generating inter-card data protection information (ICDPI) for an inter-card card stripe to be stored during a WRITE operation; and (d) providing the SLBA and the WRITE request to one or more of the Flash memory cards for use as an intra-card LBA internally therein.

BRIEF DESCRIPTION OF THE DRAWINGS

The foregoing and other advantages of the disclosed embodiments will become apparent from the following detailed description and upon reference to the drawings, wherein.

DETAILED DESCRIPTION

The Figures described above and the written description of specific structures and functions below are not presented to limit the scope of what Applicants have invented or the scope of any provided claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the figures and are not intended to limit the scope of the invention or the appended claims.

The data links described herein may take the form of serial or parallel data links.

Basic Exemplary Memory System: Turning to the drawings and, in particular, to FIG. 1 a memory storage system 1000 in accordance with certain teachings of the present disclosure is illustrated.

Figure 1:
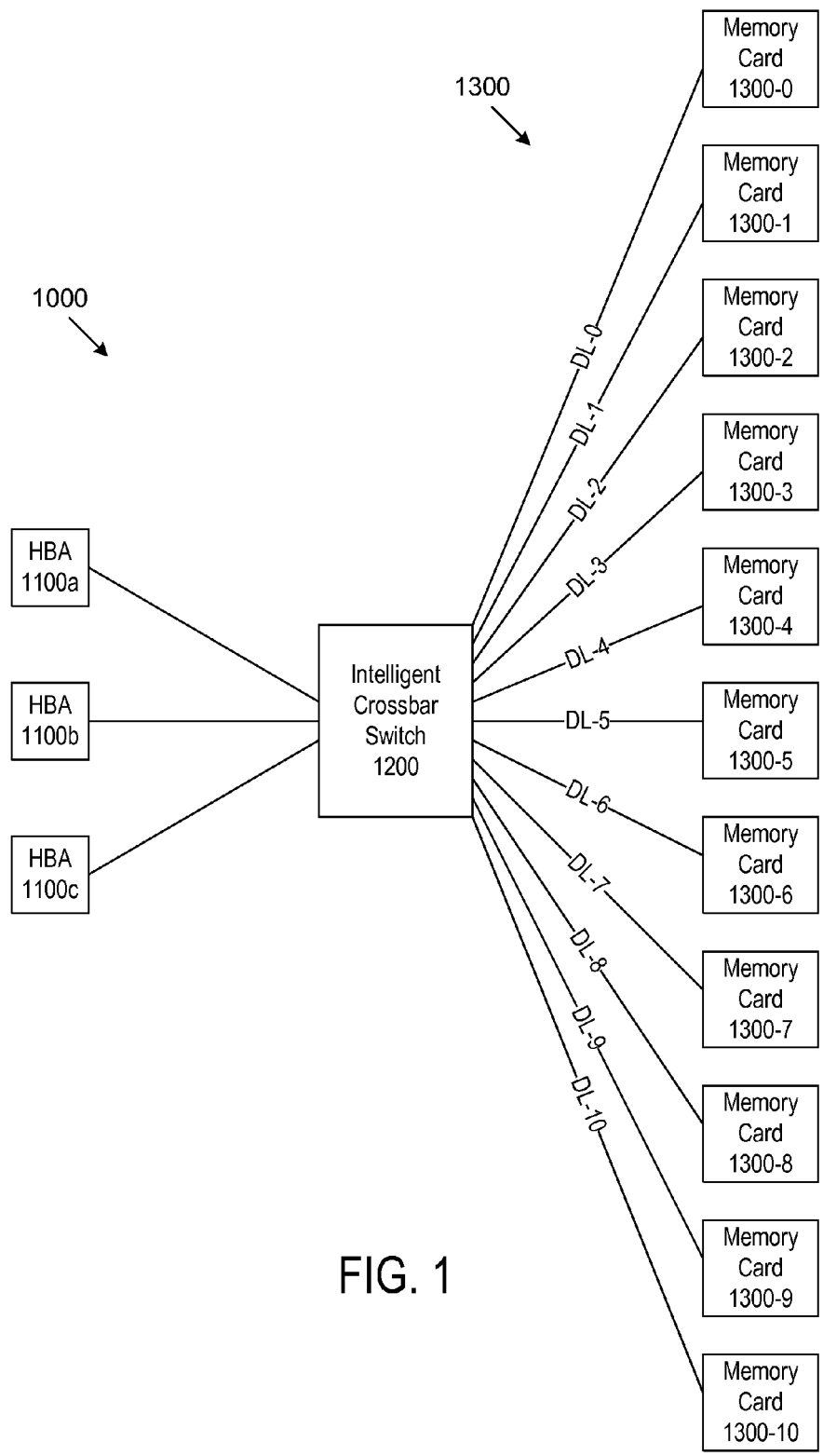
FIG. 1 illustrates an exemplary FLASH memory storage system in accordance with the present disclosure.

In general, the system 1000 of FIG. 1 is formed from three basic layers.

The first layer is a bus interface layer that, in the illustrated example, is formed from several Host Bus Adaptors ("HBAs") 1100a, 1100b, and 1100c. The HBAs may take any suitable form for receiving and providing data READ and data WRITE requests from one or more external host devices, for example, from external servers seeking to write data into, or read data from, the memory system 1000.

In general, the data READ and WRITE requests received by the HBAs include: (i) a Logical Block Address (LBA) reflecting a specific logical address to which the external host wishes to begin writing data for a WRITE request or to begin reading data for a READ request; (ii) an indication of the amount of data to be read or written; and (iii) for a WRITE request, the data to be written. Other information may be included in READ or WRITE requests without departing form the teachings herein.

The HBAs 1100a, 1100b and 1100c are each linked via a data link to an intelligent crossbar switch 1200, which is the second layer of the system 1000. Upon receipt of a data READ or data WRITE request from an external host, each HBA will transmit that request to the crossbar switch 1200.

As explained in more detail below, the intelligent crossbar switch 1200 receives READ and WRITE requests from the HBAs and processes those requests to: (i) generate a second-level LBA (SLBA) for use in processing the READ or WRITE requests; (ii)(a) for WRITE requests, generate inter-card data protection information (ICDPI) for an inter-card card stripe to be stored in the system 1000 during a WRITE operation, or (ii)(b) for READ requests, process stored ICDPI to correct errors encountered during a READ operation for an inter-card card stripe stored in the system 1000; and (iii) provide the SLBA and the request to an appropriate physical memory card for processing.

The intelligent crossbar switch 1200 is coupled via individual data links to a plurality of physical memory cards, indicated generally at 1300, which forms the third layer of the system 1000. In the exemplary implementation shown, there are eleven physical memory cards 1300-0, 1300-1, 1300-2, . . . , 1300-9, and 1300-10, and eleven dedicated data links DL-0, DL-1, DL-2, . . . , DL-9, and DL-10 provided between the intelligent crossbar switch 1200 and each of the individual memory cards. It is of course possible to have a different number of physical memory cards besides the eleven shown here without departing from the disclosed embodiments.

In some embodiments, the physical memory cards 1300-0 to 1300-10 are constructed and operate in accordance with the teachings of the above-referenced U.S. Pat. No. 7,856,528, which is hereby incorporated by reference in its entirety. In general, with a few exceptions, one of which is discussed below, each memory card 1300-0 to 1300-10 comprises a printed circuit board (PCB) having one or several Flash-based memory systems thereon that each operates like the system 100 described in U.S. Pat. No. 7,856,528 in that it receives READ and WRITE requests and then processes those requests to generate intra-card page stripes and utilizes intra-card data protection stripes to store, protect and retrieve data. The primary difference between the system 100 described in U.S. Pat. No. 7,856,528 and the memory cards 1300-0 to 1300-10 used herein is that the system 100 receives READ and WRITE requests containing LBAs provided by an external host, while in the system 1000 described herein, the memory cards 1300-0 to 1300-10 receive READ and WRITE requests that include SLBAs generated by the intelligent crossbar switch 1200 (based on READ and WRITE requests received from the external hosts that include LBAs generated external to the memory system 1000).

In general operation, an external host issue a READ or WRITE request to the system 1000 that is received by the intelligent crossbar switch 1200 over one of the HBAs 1100a, 1100b, or 1100c. As mentioned above, such requests typically include an LBA reflecting a specific logical address to which the external host needs to begin writing data for a WRITE request or to begin reading data for a READ request, an indication of the amount of data to be read or written, and if the request is a WRITE request, the data to be written.

Upon receiving a WRITE request, the intelligent crossbar switch 1200 organizes the data to be written into a plurality of data pages and one data protection page. In the example shown here, the data to be written is organized into ten data pages and one data protection page. As with the memory cards, it is of course possible to have a different number of data pages and data protection pages besides the ten data pages and the one data protection page discussed herein.

The intelligent crossbar switch 1200 thereafter determines, although not necessarily in the order listed here: (a) an SLBA based on the LBA received from the external host, (b) one of the memory cards 1300-0 to 1300-10 to be used as the data card for storage of a received data page, or for the storage of the initial page of received data if multiple pages are received, and (c) one of the memory cards 1300-0 to 1300-10 to be used as a data protection card for storage of the inter-card data protection information.

At some point, the intelligent crossbar switch 1200 sends the data pages to the ten memory cards in which the received data is to be stored, and the inter-card data protection page to the card designated for the storage of such data. The storage of the ten data pages and one data protection page in the above manner produces the inter-card card stripe mentioned previously.

Upon receipt of WRITE requests and pages of data from the intelligent crossbar switch 1200, each memory card will store the data within intra-card page stripes in the manner described, for example, in U.S. Pat. No. 7,856,528.

The combination of the inter-card data protection stripes provided by the intelligent crossbar switch 1200 and the intra-card data protection stripes provide by the memory cards results in two layers of data protection for the system 1000 such that data may be reconstructed even upon complete failure of an entire memory card.

In accordance with the disclosed embodiments, instead of providing an LBA to each physical memory card 1300-0 to 1300-10, the intelligent crossbar switch 1200 provides the SLBA to each physical memory card to be used as an LBA internally within each card. In some embodiments, for a given LBA received from the external host, the intelligent crossbar switch 1200 may determine the SLBA by dividing the LBA by the total number of data pages and taking the integer thereof, as follows: SLBA=INT(LBA/D)], where INT is the integer function and D is the total number of data pages in the inter-card card stripe. Thus for a given inter-card stripe, all of the data pages (and the data protection page) within the inter-card stripe will share a common SLBA. Consider, for example, a scenario in which the number of data pages D in the inter-card stripe is 10. An LBA of 25 would be mapped to an SLBA of 2, an LBA of 237 would be mapped to an SLBA of 23, and an LBA of 4,567 would be mapped to an SLBA of 456.

As for the initial data card, in some embodiments, for WRITE operations the intelligent crossbar switch 1200 may determine the data card on which to store the data (when one page of data is received) or the initial data card to begin storing data (when multiple pages are received) by performing a modulo operation using the LBA and the total number of data pages, as follows: Initial Data Card=LBA MOD D where LBA is the LBA received from the external host, MOD is the modulo function, and D is again the total number of data pages in the inter-card protection stripe. Consider again the example in which D equals 10. For an LBA of 25, the initial data card is 5. For an LBA of 237, the initial data card is 7. For an LBA of 4567, the initial data card is 7.

In some embodiments, the intelligent crossbar switch 1200 may determine the data protection card for storing the data protection page by performing a modulo operation using the SLBA (not LBA) and the total number of data pages plus one, as follows: Data Protection Card=SLBA MOD (D+1), where SLBA is the SLBA determined as specified above, MOD is again the modulo function, and D is again the total number of data pages in the inter-card card stripe. Thus, for example, using the above examples, where D is 10, the card on which the inter-card data protection would be stored, for an LBA of 25 would be (INT[25/10]) MOD 11 or 2 MOD 11 or 2; for an LBA of 236 would be (INT[236/10]) MOD 11 or 23 MOD 11 or 1; and for an LBA of 4567 would be (INT[4567/10]) MOD 11 or 456 MOD 11 or 5.

Consider a WRITE request, for example, in which ten consecutive data pages are written starting at LBA 241. It is important to note that these ten pages actually span two different SLBAs. For LBAs 241 through 249, the SLBA is identical and equals INT(LBA/10) or 24. For LBA 250, the final page in the write operation, the SLBA equals INT(250/10)=25. These two cases will be considered separately. For the pages in SLBA 24 (LBA 241 through 249) the data pages are calculated to reside on cards 1 through 9 (LBA MOD 10).

Figure 2:
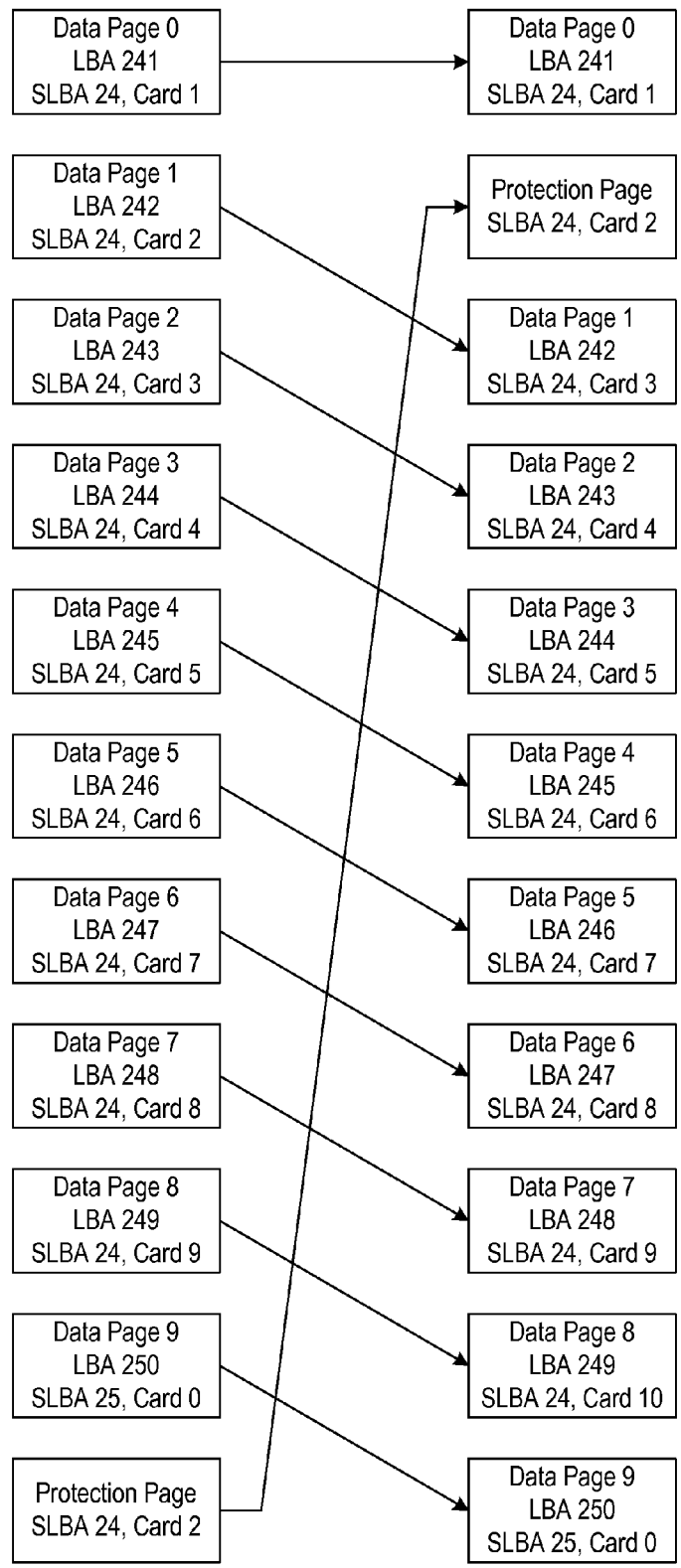
FIG. 2 illustrates an exemplary implementation of the FLASH memory storage system in accordance with the present disclosure.

Note, however, that the data protection page for SLBA 24 is also calculated to reside on card 2, since 24 MOD 11 equals 2. For this reason, all data pages originally calculated to reside on cards greater than or equal to 2 (or the card for the data protection page) are stored on the next card higher within the card stripe, as depicted in FIG. 2. As can be seen, LBA 241 is stored at SLBA 24, card 1, and LBA 242 is stored at SLBA 24, card 3, since the data protection page is stored on card 2. LBA 243 is stored at SLBA 24, card 4, and so on, with LBA 249 being stored at SLBA 24, card 10. The page corresponding to LBA 250 is stored at SLBA 25, card 0, and the data protection page for the card stripe at SLBA 25 is stored on card 3. For both card stripes (SLBA 24 and SLBA 25), each card in the stripe is accessed using the SLBA for the stripe (SLBA 24 for LBAs 241 through 249, and SLBA 25 for LBA 250).

A READ request from the external host is processed by the intelligent crossbar switch 1200 in a similar manner as the WRITE request described above except that instead of writing data to the physical memory cards, the data pages associated with the READ request and the data protection page would be retrieved from the physical memory cards.

It should be noted that a WRITE operation may not involve a writing of a complete inter-card card stripe or the creation of a new data protection page. Thus, for example, if a WRITE operation is associated with a single page of data associated with a data page already in storage, the WRITE operation could involve a write of only a single page of data to the SLBA and the card associated with the received LBA. Instead of re-writing the entire inter-card card stripe (including the data protection page for that inter-card card stripe), the intelligent cross bar could: (a) retrieve the inter-card data protection page, (b) retrieve the old (i.e., to be replaced) data previously associated with the SLBA at issue; (c) perform an XOR operation on the retrieved data protection information with the retrieved old (i.e., to be replaced data) and then (d) perform an XOR operation on the results of (c) with the new data associated with the SLBA to obtain a new data protection page that can then be stored on the appropriate card for the data protection page (at the SLBA address).

While a number of specific examples been described in the context of preferred and other embodiments, not every embodiment of the invention has been described. Obvious modifications and alterations to the described embodiments are available to those of ordinary skill in the art. The disclosed embodiments are not intended to limit or restrict the scope or applicability of the invention conceived by the Applicants, but rather, in conformity with the patent laws, Applicants intend to protect fully all such modifications and improvements.

What is claimed is:

1. A Flash-based memory module, comprising:
 a plurality of input/output (I/O) modules, each I/O module configured to communicate with an external device over one or more external communication links;
 a cross-bar switching element connected to and in communication with one or more of the I/O modules;
 a plurality of Flash memory cards connected to and in communication with the crossbar switching element, each Flash memory card having a printed circuit board (PCB) and a plurality of Flash memory systems mounted on the PCB, wherein each Flash memory system comprises:
 a) a plurality of Flash memory devices, each Flash memory device having a physical memory space that is divided into blocks, each block being further divided into pages, each page representing an individually addressable memory location on which memory operations are performed, multiple memory locations being erased at the same time in one-block groupings; and
 b) a Flash controller communicating independently with each Flash memory device to perform the memory operations, the Flash controller configured to store data in the Flash memory devices in the form of intra-card page stripes, each intra-card page stripe comprising a plurality of pages, including data pages and a data protection page, and each of the plurality of pages in the intra-card page stripe being stored in a Flash memory device that is different from the Flash memory devices in which the other pages in the intra-card page stripe are stored, the Flash controller further configured to maintain one or more buffers containing information reflecting blocks of memory within the Flash memory devices that include memory locations previously used to store pages of an intra-card page stripe having a first number of pages and that are currently available for storage of pages, and dynamically assemble the intra-card page stripes using the information contained in the one or more buffers, wherein the number of pages to be included in an intra-card page stripe is based on the information contained in the one or more buffers and the number of pages varies from the first number of pages to a second number of pages, where the first number is different from the second number and where at least one dynamically assembled intra-card page stripe has the second number of pages and includes a storage location previously used to store a page in an intra-card page stripe having the first number of pages; and
 wherein the cross-bar switching element is configured to store data in the Flash memory cards in the form of inter-card card stripes, each inter-card card stripe comprising a plurality of pages, including data pages and a data protection page, and each of the plurality of pages in the inter-card card stripe being stored in a Flash memory card that is different from the Flash memory cards in which the other pages in the inter-card card stripe are stored.

2. The Flash-based memory module of claim 1, wherein the Flash controller is configured to access a logical-to-physical translation table that associates a logical address of a memory operation with a physical address of a memory location.

3. The Flash-based memory module of claim 1, wherein the cross-bar switching element is configured to receive a logical block address (LBA) from one of the I/O modules in connection with a READ or WRITE request, generate a second-level LBA (SLBA) for the READ or WRITE request, and provide the SLBA and the READ or WRITE request to an appropriate one of the Flash memory cards for processing.

4. The Flash-based memory module of claim 1, wherein the cross-bar switching element is configured to dynamically assemble inter-card card stripes using blocks of memory within the Flash memory cards that include memory locations previously used to store pages of an inter-card card stripe having a first number of pages and that are currently available for storage of pages.

5. The Flash-based memory module of claim 4, wherein the number of pages to be included in an inter-card card stripe varies from the first number of pages to a second number of pages, where the first number is different from the second number and where at least one dynamically assembled inter-card card stripe has the second number of pages and includes a storage location previously used to store a page in an inter-card card stripe having the first number of pages.

6. A method of protecting data in a Flash-based memory module, the Flash-based memory module including a plurality of input/output (I/O) modules, each I/O module configured to communicate with an external device over one or more external communication links, a cross-bar switching element connected to and in communication with one or more of the I/O modules, and a plurality of Flash memory cards connected to and in communication with the crossbar switching element, each Flash memory card having a printed circuit board (PCB) and a plurality of Flash memory systems mounted on the PCB, each Flash memory system having a plurality of Flash memory devices, the method comprising:

storing data in the Flash memory devices in the form of intra-card page stripes, each intra-card page stripe comprising a plurality of pages, including data pages and a data protection page, and each of the plurality of pages in the intra-card page stripe being stored in a Flash memory device that is different from the Flash memory devices in which the other pages in the intra-card page stripe are stored;

maintaining one or more buffers containing information reflecting blocks of memory within the Flash memory devices that include memory locations previously used to store pages of an intra-card page stripe having a first number of pages and that are currently available for storage of pages;

dynamically assembling the intra-card page stripes using the information contained in the one or more buffers, the number of pages to be included in an intra-card page stripe being based on the information contained in the one or more buffers and the number of pages varies from the first number of pages to a second number of pages, where the first number is different from the second number and where at least one dynamically assembled intra-card page stripe has the second number of pages and includes a storage location previously used to store a page in an intra-card page stripe having the first number of pages; and storing data in the Flash memory cards in the form of inter-card card stripes, each inter-card card stripe comprising a plurality of pages, including data pages and a data protection page, and each of the plurality of pages in the inter-card card stripe being stored in a Flash memory card that is different from the Flash memory cards in which the other pages in the inter-card card stripe are stored.

7. The method of claim 6, further comprising configuring the Flash controller to access a logical-to-physical translation table that associates a logical address of a memory operation with a physical address of a memory location.

8. The method of claim 6, further comprising configuring the cross-bar switching element to dynamically assemble inter-card card stripes using blocks of memory within the Flash memory cards that include memory locations previously used to store pages of an inter-card card stripe having a first number of pages and that are currently available for storage of pages.

9. The method of claim 6, further comprising varying the number of pages to be included in an inter-card card stripe from the first number of pages to a second number of pages, where the first number is different from the second number and where at least one dynamically assembled inter-card card stripe has the second number of pages and includes a storage location previously used to store a page in an inter-card card stripe having the first number of pages.

10. The method of claim 6, further comprising configuring the cross-bar switching element to receive a logical block address (LBA) from one of the I/O modules in connection with a READ or WRITE request, generate a second-level LBA (SLBA) for the READ or WRITE request, and provide the SLBA and the READ or WRITE request to an appropriate one of the Flash memory cards for processing.

* * * * *